March 14, 1939.  G. TREMOLADA  2,150,529
ROTARY SWIVEL
Filed July 14, 1937  3 Sheets-Sheet 1
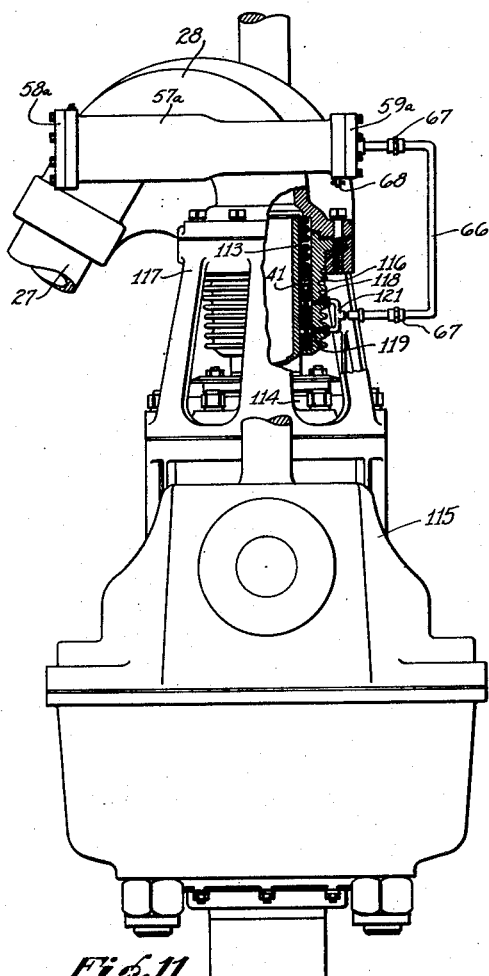
Fig. 11
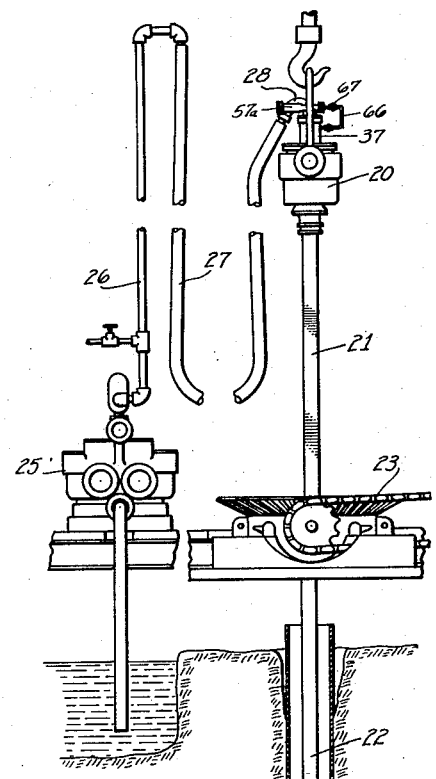
Fig. 1
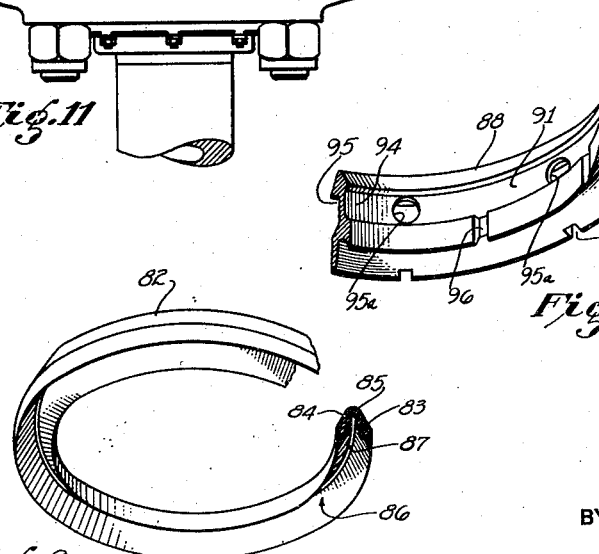
Fig. 7
Fig. 6
INVENTOR
Guglielmo Tremolada
BY
ATTORNEY March 14, 1939.　　　G. TREMOLADA　　　2,150,529
ROTARY SWIVEL
Filed July 14, 1937　　　3 Sheets-Sheet 3

INVENTOR
Guglielmo Tremolada
BY
ATTORNEY

Patented Mar. 14, 1939

2,150,529

UNITED STATES PATENT OFFICE 2,150,529

ROTARY SWIVEL

Guglielmo Tremolada, Los Angeles, Calif., assignor to Emsco Derrick & Equipment Company, Los Angeles, Calif., a corporation of California Application July 14, 1937, Serial No. 153,545

6 Claims. (Cl. 255—25)

This application is a continuation-in-part of my copending application entitled Automatically lubricated rotary swivel, Serial No. 58,869, filed January 13, 1936.

My invention relates to equipment employed in the drilling of oil wells and relates particularly to a rotary swivel. Rotary swivels are commonly employed in the drilling of an oil well for the supporting of the string of drill pipe which extends into the well. The rotary swivel not only supports the weight of the string of drill pipe but also acts as a means whereby the rotary hose, which is nonrotatable, is connected to the rotating drill pipe so that rotary mud may be supplied to the well through the drill pipe. In view of this function it is necessary that the rotary swivel have a conduit means which has a relatively stationary part connected to the rotary hose and a relatively rotatable part connected to the drill pipe. These two parts must be connected together by a suitable sealing means or packing arrangement in order that leakage will not occur. The packing arrangement commonly employed usually wears away and wears the associated parts in view of the fact that the rotary mud is highly abrasive and enters the packing arrangement.

It is an object of the invention to provide a rotary swivel having a novel form of packing means capable in itself of resisting wear to a maximum degree and having associated therewith a means for keeping drilling mud from entering the packing device.

It is another object of my invention to provide a unique method of forming a seal between relatively rotating parts and of protecting the parts forming the seal from wear by amply lubricating such parts and by excluding foreign matter therefrom.

It is a still further object of my invention to provide a rotary swivel including a packing arrangement between relatively rotating parts in which there is a continuous flow of sealing substance, such as lubricant or grease, from the closest or posterior part of the packing arrangement to the open or anterior end thereof which is in communication with the rotary mud passage.

It is a further object of my invention to provide a rotary swivel having relatively rotating conduit parts which cooperate to provide a packing chamber having a closed posterior end and an anterior end in open communication with the rotary mud passage in which packing or other filler material is placed in the packing chamber under pressure, and in which the sealing substance is continuously flowed from the posterior part to the anterior end of said packing chamber and around said packing or filler material.

It is a still further object of my invention to provide a rotary swivel having a packing arrangement, as pointed out above, in which a thin layer of grease is maintained between the surfaces of the walls forming the packing chamber and the packing in order that frictional contact will be eliminated and in order that not only will the parts be lubricated but foreign matter excluded. By this arrangement the parts will not overheat and will have relatively long life.

It is a still further object of my invention to provide a stuffing box having a packing arrangement of the general character referred to heretofore in which I employ a packing which permits a free flow from the posterior to the anterior end thereof, but resists a flow from the anterior to the posterior part thereof. By this arrangement it is possible to flow the sealing substance from the posterior to the anterior part of the packing chamber in order to achieve the new results and advantages pointed out but in which rotary mud cannot possibly flow from the anterior to the posterior part of the packing chamber.

It is a still further object of my invention to provide a rotary swivel, as pointed out above, in which the sealing substance in the form of grease or lubricant is maintained in a chamber which includes differential pressure means connected to the rotary mud passage of the rotary swivel in such a way that the pressure causing the sealing substance to flow through the packing chamber from the posterior to the anterior end thereof is always greater than the pressure of the rotary mud flowing through the rotary swivel.

It is a still further object of my invention to provide a rotary swivel in which the grease reservoir may be refilled while the device is in operation.

It is a further object of my invention to provide a rotary swivel of the character pointed out heretofore which includes a visible signal means so that the operator will know when the grease reservoir has been emptied.

It is a further object of the invention to provide a device of the above character which is automatically operated by pressure obtained from the supply of drilling mud which is being conducted to the string of drill pipe.

It is a further object of the invention to provide a simple and rugged mechanism embodying the features and functions of the invention.

In the following description I will describe forms of my invention which incorporate the essential features of my invention. It should be understood, however, that the various features are susceptible of independent use, and in addition various modifications and alterations may be made. It should be understood, therefore, that the ensuing description and accompanying drawings are illustrative of forms of the invention in such detail as to instruct those skilled in the art as to how my invention may be practiced. It is not intended that the same be a limitation on the embodiment or form in which my invention may be put into practice.

Further objects and advantages of the invention will be brought out in the following part of the specification.

Referring to the drawings, which are for illustrative purposes only,

Fig. 1 is a schematic view showing the manner in which a form of the invention is connected to a drilling string in a well.

Fig. 2 is a view to enlarged scale and partly sectioned showing an embodiment of the rotary swivel.

Fig. 3 is an enlarged sectional view through the packing arrangement of my invention.

Fig. 5 is a fragmentary sectional view taken as indicated by the line 5—5 of Fig. 3.

Fig. 6 is a perspective view of a packing element which I employ in the forms of my invention disclosed herein.

Fig. 11 is a view partly in section showing an alternative form of my invention.

Figure 7:
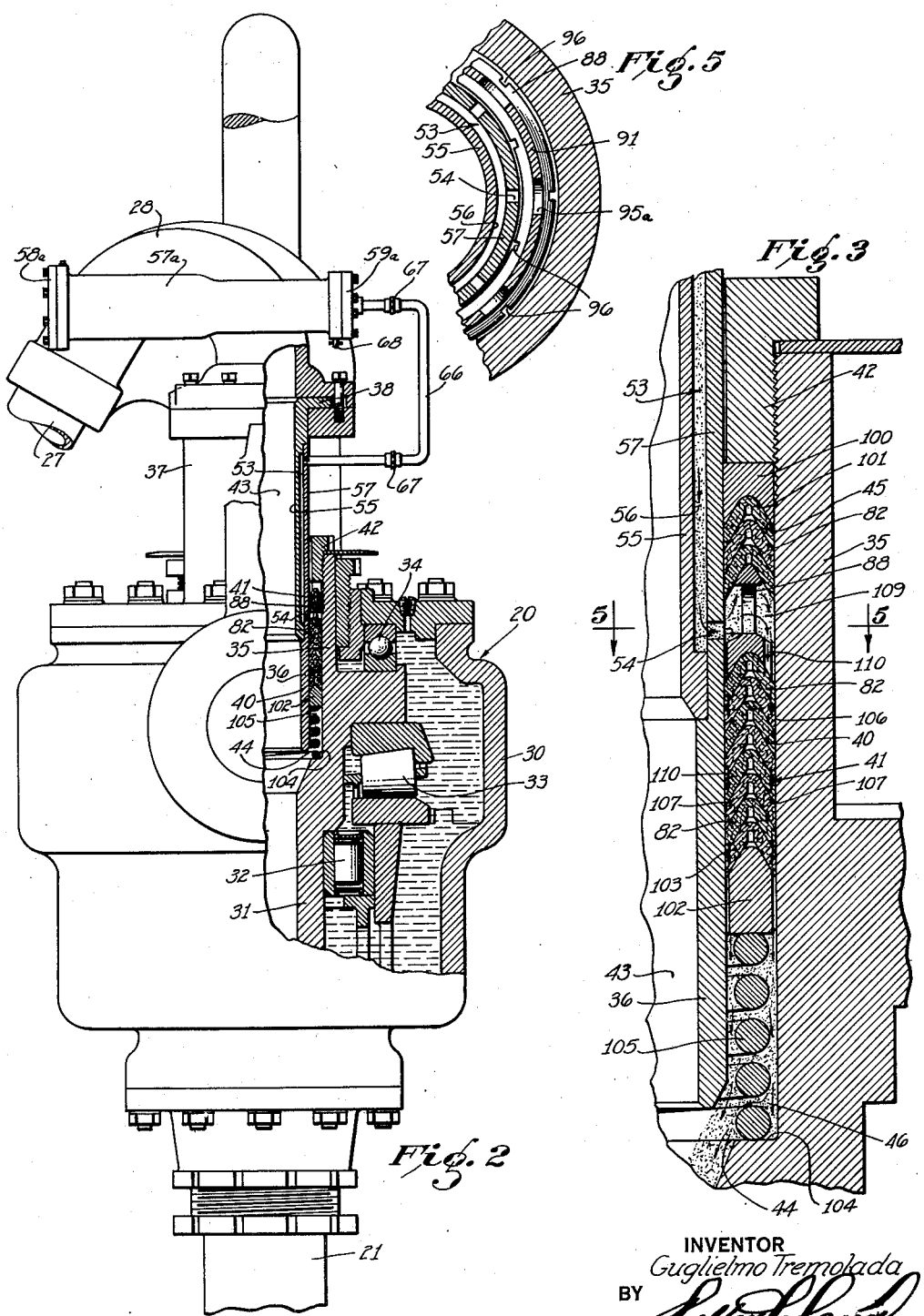
Fig. 7 is a fragmentary perspective view of a spacer member employed in the packing means of my invention.

As shown in Fig. 1, the rotary swivel 20 embodying my invention is secured to the upper end of a hollow bar 21, ordinarily referred to as the Kelly bar, having a square exterior cross-section, which bar 21 forms the upper end of a drill string 22 and passes through a rotary table 23 so as to be thereby rotated in order to rotate a drill bit, such as 24, in the bottom of the hole being drilled. To supply drilling mud to the drilling string, a mud pump 25 is employed which has a standpipe 26 projecting upwardly therefrom to connect with a rotary hose 27 which extends to a gooseneck fitting 28 at the upper end of the swivel 20.

The swivel 20, as shown in Fig. 2, comprises a shell 30 carrying a hollow spindle or mandrel 31 which is connected to the upper end of the Kelly 21. The spindle 31 is carried in radial bearing means 32 and thrust bearing means 33 in accordance with general practice, there being a down thrust bearing 34 for limiting the upward movement of the spindle 31 relative to the shell 30. The spindle 31 constitutes a weight supporting member subjected to the load of the drilling string 22, and the shell 30 with its associated bearings constitutes a means for carrying the weight supporting member so that it may rotate.

Connected to the spindle 31, or forming a part thereof, is a rotatable annular wall 35 which is preferably tubular or cylindrical in form and lies in opposing or face-to-face relation to a non-rotatable annular wall 36, referred to hereinafter as a wash pipe. The wash pipe 36 is of replaceable character and is supported in downwardly extending relationship by a yoke 37 on the upper part of the shell 30. The upper end of the wash pipe 36 has a radial flange 38 which lies against the upper face of the yoke 37, and to the upper face of the flange 38 the gooseneck fitting 28 is bolted as shown so that the drilling mud will be conducted from the rotary hose 27 into the upper end of the hollow spindle 31 through which it passes downwardly into the drilling string.

The annular walls 35 and 36 are of such size that an annular packing chamber 40 is formed therebetween in which a packing device 41 is disposed. This annular packing chamber, as illustrated best in Fig. 3, is formed between the relatively telescoping parts 35 and 36. The upper end of the packing chamber is closed by a suitable closure means, such a nut 42. The lower end of the packing chamber, however, is in open communication with a rotary mud passage 43 which is formed through these parts through an opening or entrance 44. The packing chamber 40 of my invention by reason of this construction has a closed posterior end 45 and an open anterior end 46, which end 46 is in open communication with the rotary mud passage 43 and is subjected to the pressure of the rotary mud which may be in the swivel. Formed in the wall of the wash pipe 36 is a passage 53 which is of such vertical length that a port 54 at the lower end thereof will connect with the packing chamber 40.

In order to form the grease passage 53, the wash pipe 36 is made of an inner tubular part 55 having a grove 56 therein and an outer tubular part 57 which is placed upon the inner member 55 in such manner as to cover and seal the groove 56.

Figure 8:
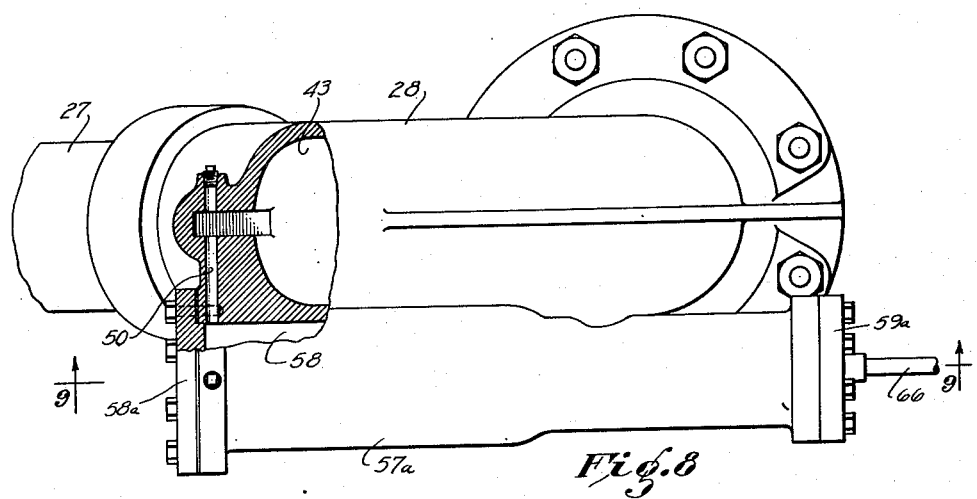
Fig. 8 is a plan view partially sectioned showing the gooseneck of the rotary swivel of my invention illustrating the grease reservoir and pressure applying means.
Figure 9:
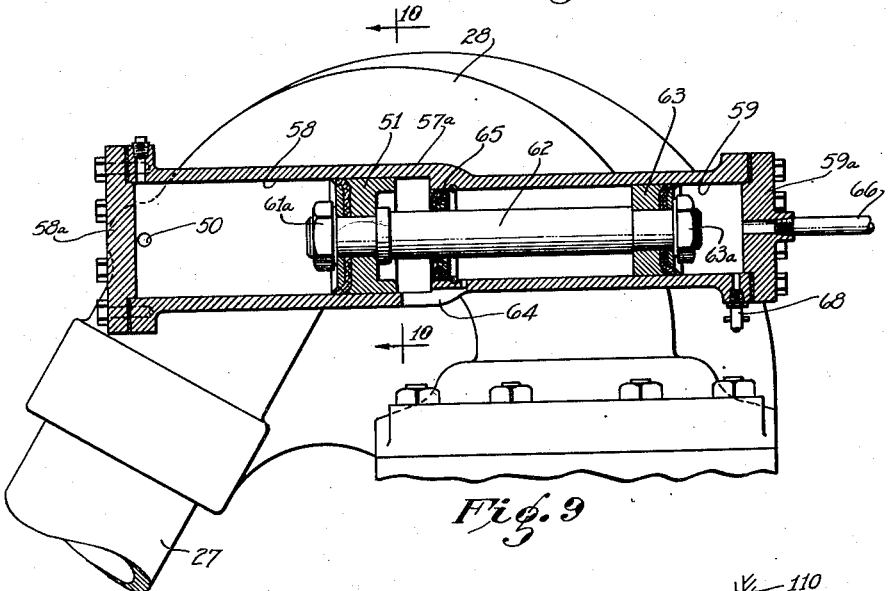
Fig. 9 is a sectional view taken as indicated by the line 9—9 of Fig. 8.
Figure 10:
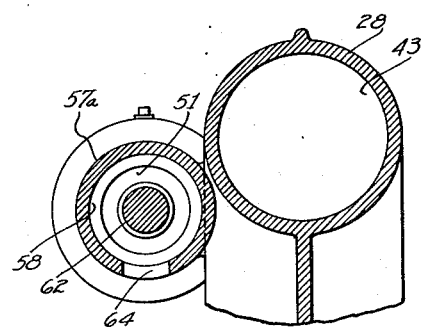
Fig. 10 is a section taken as indicated by the line 10—10 of Fig. 9.
Figure 4:
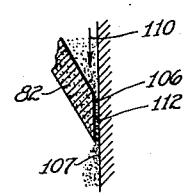
Fig. 4 is a fragmentary sectional view diagrammatically illustrating the manner in which grease flows past the packing elements of my invention.

As shown in detail in Figs. 8 to 10, the gooseneck 28 which forms part of the rotary mud passage 43 has a cylinder body 57a formed integrally on the side thereof. This cylinder 57a extends horizontally as shown and is positioned so that it will not interfere with the usual operations of the rotary swivel. As shown in section in Fig. 8, the body 57a is bored out to provide a power cylinder or rotary mud cylinder 58 and a sealing substance or grease or lubricant cylinder 59. The ends of the cylinders are closed by suitable end plates 58a and 59a. The left end of the cylinder 58 is connected through a passage 50 to the interior of the gooseneck 28 so that the left end of the cylinder 58 is at all times subjected to rotary mud which is under the same pressure as the rotary mud in the gooseneck.

Supported in the cylinder 58 is a piston 51 which may be of any suitable construction. This piston 51 is secured, such as by a nut 61a to a piston rod 62. On the opposite end of the piston rod 62 is a second piston 63 secured in place, such as by a nut 63a. At the point of juncture of the cylinders 58 and 59 is an inspection port 64 through which a workman may see in order to determine whether or not the piston 51 is in its extreme rightward position. To prevent rotary mud or other foreign matter from entering the cylinder 58 there is provided a packing means 65 which forms a seal around the rod 62. The rightward end of the grease or lubricant chamber 59 is connected by piping 66 to the upper end of the grease passage 53 so that grease may be supplied thereto. Suitable unions 67 are provided in order that the piping 66 may be conveniently installed. For the purpose of introducing grease into the grease chamber 59 I provide a suitable grease nipple 68 in communication with the rightward end of the chamber 58, as shown in Fig. 9. Grease may be introduced by suitable pressure apparatus, such as an Alemite gun, or equivalent, now in general use in various industries where lubrication is required. When the grease is introduced through the grease nipple 68 pressure may be developed greater than that produced by rotary mud in the chamber 58 so that the pistons and rod will be moved in a leftward direction. At this time any rotary mud in the chamber 56 will be forced outwardly through the passage 50 and into the rotary mud passage 43 of the gooseneck 28.

In Figs. 3 to 7 inclusive I show my novel form of packing device 41 which is placed in the chamber 40. In this packing device 41 I employ a plurality of packing rings 82 which are formed by pressure from leather, as shown in Fig. 6, to provide an inner wall portion 83 and an outer wall portion 84 disposed in V-shaped arrangement and meeting at a ridge or corner 85. The relatively sloping wall portions 83 and 84 form a channel 86 of V cross-section, and a narrow groove 87 is pressed into the leather at the bottom or apex of the channel 86. The ring 82 is in groups to form sealing sections which are separated by a spacing ring 88 which, as shown in Fig. 7, has an upper ridge portion 90 of triangular cross-section, a thin intermediate annular wall or web 91, and a lower annular base or body portion 92 having an outwardly presented groove or channel 93 which is shaped to fit the external face of the ring 82. Along the faces of the wall 91 are annular channels 94 and 95 through which the lubricant may circulate, and axially extending grooves 96 are formed in the side faces of the body 92 through which lubricant may pass freely to the packing rings 82 disposed adjacent the body. The annular channels 94 and 95 are connected by openings 95a through the wall 91.

In the arrangement of packing means shown in Fig. 3 I place a backing ring 100 in the posterior part or end 45 of the packing chamber 40. This backing ring has a V-shaped channel 101 as illustrated. I then install a plurality of packing elements or packing rings 82 in nested relation with the apexes extending upwardly as shown. I then install the spacer ring 88 as shown and then a plurality of packing elements 82. I then install a follower ring 102 having an upper V-shaped portion 103 which engages the lowermost packing element. Compressed between the follower ring 102 and a shoulder 104 provided by the spindle 31 is a spring 105 which exerts an upward pressure tending to hold the parts in the positions illustrated in Fig. 3.

It will be seen that any upward pressure against the packing means tends to force the side walls or parts thereof outwardly so that end faces 106 of the packing elements are brought into pressural contact with surfaces 107 or walls which form the packing chamber 40. In view of the fact that the anterior end of the packing chamber is in communication with the rotary mud passage 43, pressure in the rotary mud pasage 43 will at all times exist at least in that part of the packing chamber below the follower ring 102.

In the operation of my invention the rotary swivel is put into use as illustrated in Fig. 1. The slush pump 25 is set into motion, and rotary mud is pumped through the parts 26 and 27 to the gooseneck 28. The rotary mud passes downwardly through the associated parts which cooperate to provide the rotary mud passage 43 and enters the Kelly 21 through which it flows downwardly through the drill pipe 22 to the bit 24. At the same time the rotary machine is set into operation so that the drill pipe is rotated. The spindle 31, being directly connected to the drill pipe, will rotate, with the result that the walls forming the packing chamber will be relatively rotatable, and in the form of my invention just described the outer wall 35 will rotate while the inner wall or wash pipe 36 will remain stationary.

When a pressure builds up in the rotary swivel, and particularly in the gooseneck, rotary mud will, of course, flow through the passage 50 and into the left end of the power chamber 58, thus exerting a pressure against the piston 51. Considering that the grease or lubricant chamber 59 has previously been filled, the piston arrangement and rod will occupy an extreme leftward position, and when pressure is exerted they will gradually move in a rightward direction, thus forcing lubricant outwardly from the chamber 58 through the pipe 66 into the lubricant passage 53 and from thence into an accumulation chamber 109 formed in the packing chamber by the spacer ring 88. This occurs until a pressure is built up therein, and when this pressure is built up the packing elements 82 above the accumulation chamber 109 will be forced outwardly so that a leak-proof seal is formed at that point. This prevents grease or other sealing substance from flowing upwardly from between the parts 35 and 36. These parts will not be subjected to great wear due to the fact that they are lubricated and being in the posterior part of the packing chamber are never contacted by any foreign substance.

When pressure has been built up in the accumulation space 109, as previously pointed out, and the upper sealing elements have been sealed the grease commences to flow downwardly, as indicated by arrows 110. This downward flow is occurring at the same time that a rotary mud pressure exists in the lower part of the packing chamber below the follower 102. It will be noted that the pistons 51 and 63 are of different diameters and this produces a differential in pressure so that the pressure of the sealing substance will at all times be greater than the pressure of the rotary mud. It will be seen that as the rotary mud pressure increases or decreases the pressure of the sealing substance or grease or lubricant also increases and decreases, but that, nevertheless, the pressure of the sealing substance is at all times greater than the pressure of the rotary mud. This differential in pressure is adequate to produce an unbalance of pressure in the packing chamber which results in a continuous flow of sealing substance through the packing chamber at all times while the device is in operation. This flow of sealing substance is from the posterior part to the anterior end of the packing chamber, and it flows into the lower part of the packing chamber and thence through the entrance 44 into the rotary mud passage 43. This continuous and slow downward flow of sealing substance produces a pressure against the outer end portions of the packing elements 82 and tends to form them into a sharper V-shape than they assume when no grease pressure is applied. This results in the end walls 106 moving inwardly out of contact with the surfaces 107 with the result that a relatively small grease space 112 is formed through which the grease flows, as is diagrammatically indicated in Fig. 4. This provides a relatively thin layer or film of grease which is continuously travelling in a downward direction. This thin layer or film of grease passes around each of the packing elements 82 and around the follower ring 102 into the lower part or anterior end of the packing chamber 40. It is possible that due to severe agitation which results from rapid rotation of the spindle some rotary mud may be thrown into the extreme anterior end of the packing chamber, but under no circumstances will the rotary mud flow upwardly between the follower ring 102 due to the fact that the spaces 112 are relatively small and there is a continuous outflow of lubricant through these spaces.

The action of the sealing substance is first to exclude from the packing all foreign matter, and particularly the rotary mud or any abrasive particles carried thereby. The second important function of the sealing substance is to eliminate wear from the packing elements 82 and the walls 35 and 36. Due to the thin layer or film of lubricant which is caused to exist between the end faces 106 and the surfaces 107 frictional contact is eliminated. The sealing substance in effect forms a seal between these parts which is relatively anti-frictional and will cause but extremely small wear.

It is important, but not indispensable, to the invention that the packing means be designed so as to permit a flow from the posterior part to the anterior end of the packing chamber but to resist the flow in an opposite direction. In this way the flow of sealing substance outwardly through the packing chamber is not impeded other than by the opposing pressure of the rotary mud tending to force the packing rings into a more blunt V-shape and into pressural contact with the walls 35 and 36. This force, however, is overbalanced by the pressure of the sealing substance which tends to hold the sealing elements in such position that the parts assume the relative positions diagrammatically illustrated in Fig. 4.

As the grease chamber 59 becomes empty and the parts move through the positions shown in full lines in Fig. 9, the operator may observe the position of the piston 51, and when it reaches the point near the end of its rightward travel the grease chamber may be replenished. This is done, as previously pointed out, by attaching a suitable grease gun to the grease nipple 68 and injecting grease into the grease chamber 59. To do this pressure against the rod 62 in a leftward direction must exceed the pressure produced by the rotary mud in the power chamber 58, but when this occurs the piston and rod assembly will move in a leftward direction and the chamber 59 will be filled. This may be done while the device is in operation, and any increase of pressure will not interfere with the operation of the invention but may possibly result in a slightly greater flow of grease or sealing substance through the packing chamber. This, however, does absolutely no harm and the waste in grease resulting therefrom will be negligible.

In the foregoing description I have illustrated a practical embodiment of my invention for use in a rotary swivel in which the wash pipe is stationary and the spindle rotates. The packing arrangement is designed for this use and includes the necessary packing elements. If parts are reproportioned so that a number of packing elements 82 are increased or decreased, a difference in differential pressure between the sealing substance and the rotary mud may be desired. This, of course, can be readily effected by changing the relative diameters of the power and grease cylinders 58 and 59.

In the preceding part of the specification I have shown the invention embodied in a rotary swivel having a stationary wash pipe 36 and a rotary spindle 31. In Fig. 11 I show a rotary swivel embodying the invention and in which a wash pipe 113 is connected to the upper end of a spindle 114 supported so as to be turnable in a shell or casing 115. In this form of the invention the wash pipe 113 is the inner annular member of the packing means, and the outer annular wall of the packing means consists of a stationary or non-rotatable wall 116 supported by a bracket 117 mounted on the upper part of the casing 115. The packing device 41, shown in Fig. 11, is disposed between the annular members 113 and 116, and grease is automatically fed thereto through ports 118 and 119 in the non-rotatable wall 116, and these ports 118 and 119 are connected to a branch fitting 121 to the piping 66 which extends from the grease chamber 59.

As pointed out heretofore, various alterations and modifications of my invention other than those illustrated heretofore may be made without departing from the spirit and scope of my invention. For example, the type of packing elements or packing means may be varied and in place of employing a packing arrangement which permits a free flow only in one direction a common type of packing may be employed. Likewise, the means for placing the sealing substance under pressure may be varied under the principle of my invention and various parts may be changed in design or differently connected together to suit the particular needs of the particular installation of my invention. In view of these facts I do not wish my invention to be construed as limited to the details of construction as illustrated herein, but wish my invention to be broadly construed in accordance with the statement of invention appearing in the preamble and throughout the description and in accordance with the appended claims.

I claim as my invention:

1. In a rotary swivel for use in drilling wells including a body structure, a spindle having a spindle passage therethrough rotatably supported by said body, and a stationary conduit connected to deliver rotary mud to said spindle passage, said conduit and said spindle passage providing a rotary mud passage through which rotary mud is passed under pressure, the combination including: a rotatable wall on said spindle and a non-rotatable wall on said conduit cooperating to form a packing chamber having a closed posterior end and an open anterior end in communication with said rotary mud passage, said walls having side surfaces; packing means in said packing chamber including V-shaped packing elements engageable with the surfaces of said walls and being positioned to permit a flow from posterior to anterior but resist a flow from anterior to posterior in said packing chamber; a source of sealing substance connected to said rotary mud passage and operable to place on sealing substance therein a pressure in excess of the pressure of the rotary mud in said rotary mud passage; and means for delivering sealing substance from said source of sealing substance to the posterior part of said packing chamber in order to cause said sealing substance to flow continuously through said packing chamber from the posterior part to the anterior end thereof around said packing means and against the pressure of said rotary mud at said anterior end of said packing chamber.

2. In a rotary swivel for use in drilling wells including a body structure, a spindle having a spindle passage therethrough rotatably supported by said body, and a stationary conduit connected to deliver rotary mud to said spindle passage, said conduit and said spindle passage providing a rotary mud passage through which rotary mud is passed under pressure, the combination including: a rotatable wall on said spindle and a nonrotatable wall on said conduit cooperating to form a packing chamber having a closed posterior end and an open anterior end in communication with said rotary mud passage, said walls having side surfaces; packing means in said packing chamber including a plurality of V-shaped packing elements positioned in nested relationship in said packing chamber with their apexes directed toward the posterior end of said packing chamber and with end faces engageable with surfaces of said walls; a source of sealing substance connected to said rotary mud passage and operable to place on sealing substance therein a pressure in excess of the pressure of the rotary mud in said rotary mud passage; and means for delivering sealing substance from said source of sealing substance to the posterior part of said packing chamber in order to cause said sealing substance to flow continuously through said packing chamber from the posterior part to the anterior end thereof around said packing means and against the pressure of said rotary mud at said anterior end of said packing chamber.

3. In a rotary swivel for use in drilling wells including a body structure, a spindle having a spindle passage therethrough rotatably supported by said body, and a stationary conduit connected to deliver rotary mud to said spindle passage, said conduit and said spindle passage providing a rotary mud passage through which rotary mud is passed under pressure, the combination including: a rotatable wall on said spindle and a non-rotatable wall on said conduit cooperating to form a packing chamber having a closed posterior end and an open anterior end in communication with said rotary mud passage, said walls having side surfaces; packing means in said packing chamber including a plurality of V-shaped packing elements positioned in nested relationship in said packing chamber with their apexes directed toward the posterior end of said packing chamber and with end faces engageable with surfaces of said walls; pressure applying means for applying an initial pressure to said packing elements to hold same in proper position and exerting a force against said end faces of said packing elements in a direction toward said surfaces of said walls; a source of sealing substance connected to said rotary mud passage and operable to place on sealing substance therein a pressure in excess of the pressure of the rotary mud in said rotary mud passage; and means for delivering sealing substance from said source of sealing substance to the posterior part of said packing chamber in order to cause said sealing substance to flow continuously through said packing chamber from the posterior part to the anterior end thereof around said packing means and against the pressure of said rotary mud at said anterior end of said packing chamber.

4. In a rotary swivel for use in drilling wells including a body structure, a spindle having a spindle passage therethrough rotatably supported by said body, and a stationary conduit connected to deliver rotary mud to said spindle passage, said conduit and said spindle passage providing a rotary mud passage through which rotary mud is passed under pressure, the combination including: a rotatable wall on said spindle and a non-rotatable wall on said conduit cooperating to form a packing chamber having a closed posterior end and an open anterior end in communication with said rotary mud passage, said walls having side surfaces; packing means in said packing chamber including a plurality of V-shaped packing elements positioned in nested relationship in said packing chamber with their apexes directed toward the posterior end of said packing chamber and with end faces engageable with surfaces of said walls; and means for continuously delivering a sealing substance into the posterior part of said packing chamber under sufficient pressure to cause same to flow through said packing chamber toward said anterior end of said packing chamber and into said rotary mud passage, said sealing substance flowing between the end faces of said packing elements and at least the surface of one of said walls.

5. In a rotary swivel for use in drilling wells including a body structure, a spindle having a spindle passage therethrough rotatably supported by said body, and a stationary conduit connected to deliver rotary mud to said spindle passage, said conduit and said spindle passage providing a rotary mud passage through which rotary mud is passed under pressure, the combination including: a rotatable wall on said spindle and a nonrotatable wall on said conduit cooperating to form a packing chamber having a closed posterior end and an open anterior end in communication with said rotary mud passage, said walls having side surfaces; packing means in said packing chamber including a plurality of V-shaped packing elements positioned in nested relationship in said packing chamber with their apexes directed toward the posterior end of said packing chamber and with end faces engageable with surfaces of said walls; pressure applying means for applying an initial pressure to said packing elements to hold same in proper position and exerting a force against said end faces of said packing elements in a direction toward said surfaces of said walls; and means for continuously delivering a sealing substance into the posterior part of said packing chamber under sufficient pressure to cause same to flow through said packing chamber toward said anterior end of said packing chamber and into said rotary mud passage, said sealing substance flowing between the end faces of said packing elements and at least the surface of one of said walls.

6. In a rotary swivel for use in drilling wells including a body structure, a spindle having a spindle passage therethrough rotatably supported by said body, and a stationary conduit connected to deliver rotary mud to said spindle passage, said conduit and said spindle passage providing a rotary mud passage through which rotary mud is passed under pressure, the combination including: a rotatable wall on said spindle and a nonrotatable wall on said conduit cooperating to form a packing chamber having a closed posterior end and an open anterior end in communication with said rotary mud passage, said walls having side surfaces; packing means in said packing chamber, said packing means including packing adapted to fill at least a part of said packing chamber, and means whereby pressure is exerted thereagainst tending to hold same in contact with said surfaces of said walls; and means for continuously delivering a sealing substance into the posterior part of said packing chamber under sufficient pressure to cause same to flow between said packing and at least one of said surfaces toward the anterior end of said packing chamber and into said rotary mud passage.

GUGLIELMO TREMOLADA.